Dec. 23, 1969  F. S. McCALL ET AL  3,485,438
BONDING ARRANGEMENT FOR PLIES OF MULTIPLY BAGS
Filed June 19, 1968

INVENTORS
FRANK S. MC CALL
ROBERT W. BOLLING
BY
Charles P. Bauer
ATTORNEY

United States Patent Office 3,485,438
Patented Dec. 23, 1969

3,485,438
BONDING ARRANGEMENT FOR PLIES OF MULTIPLY BAGS
Frank S. McCall and Robert W. Bolling, Savannah, Ga., assignors to Union Camp Corporation, New York, N.Y., a corporation of Virginia
Filed June 19, 1968, Ser. No. 738,148
Int. Cl. B65d 33/18, 29/02, 31/04
U.S. Cl. 229—58                               2 Claims

ABSTRACT OF THE DISCLOSURE

A multiply bag comprising one or more paper plies and a ply resistant to the type of adhesive which is ordinarily used in bag-making. To create a strong bond between the plies, openings are formed in the adhesive-resistant ply, whereby the paper plies are in contact with each other and are bonded at the areas of the openings by the adhesive.

---

This invention relates to multiply bags, particularly to the manner of bonding plies of different materials which vary in bonding effectiveness to a given adhesive.

In multiply bags, various materials may be used for the several plies, the material chosen being that most suitable for the contents to be bagged. Thus, materials having different properties need to be used. However, many materials cannot be bonded properly with the material used for the paper plies. For example, paper adhesive forms a poor bond with plastic film or similar materials. Many adhesives form poor bonds with materials commonly used as the protector ply of the bag, such as wax paper, glassine and various plastics, whether used as separate plies, as coating on paper stock or laminated therewith.

An object of this invention is to improve the bond between plies of a multiply bag wherein one of the adjacent contacting plies to be bonded has a surface resistant to, or of poor reception to, the adhesive. Better bonding is accomplished by removing the portion of the adhesive-resistant ply at the bonding area so that like plies are in bonding contact.

Another object of the invention is to provide a multiply bag having a closure wherein the ply or plies receptive to the adhesive are in bonding contact.

A further object is to provide paper contact areas between plies receptive to the adhesive by providing openings in the ply or plies which are resistant to the adhesive and which normally separate the above contact areas, the openings permitting the bonding contact between like plies.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawing, in which.

The bag described herein is a duplex bag with an automatic bottom, but it will be understood that the invention may be applied to bags of more than two plies with other types of bottoms and with one or more adhesive resistant sheets in various positions. For example, the adhesive resistant sheet may be a liner ply or an intermediate ply or in both positions provided there is an adjacent ply which is receptive to adhesive.

The bag illustrated comprises an outer ply 10 which is paper coated with one of the many available plastic materials to provide liquid or moisture proofing or a barrier of the bag. The outer ply may also be a plastic film or plastic film laminated to paper. The inner ply 11 may be of any material but in this specific embodiment comprises kraft paper of suitable strength for the size of the bag and its intended contents.

Figure 1:
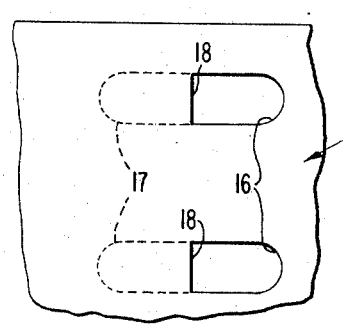
FIG. 1 is a top view of a portion of one ply with an adhesive-resistant surface showing how an opening may be provided.
Figure 2:
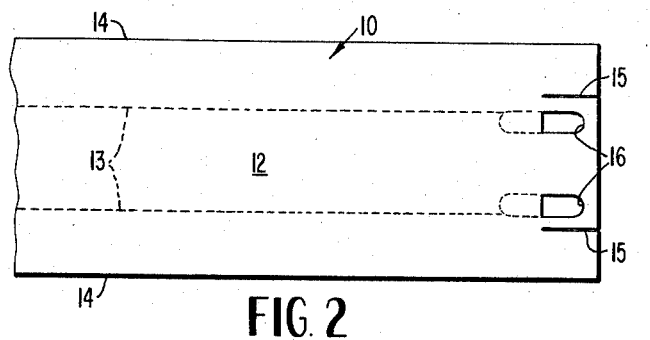
FIG. 2 is a top view of a multiply bag tube with an adhesive-resistant ply showing the slits for formation of the bottom and the openings in one ply to expose the next paper ply.

The bag is of conventional construction having two faces, gussets and a bottom and is made in a manner well known in the art on conventional bag machines. In making this bag the two plies are formed into a tube 12 (FIG. 2) with the sides infolded on lines 13 to form pleats or gussets 14 along each edge. Prior to forming this tube each ply is slit on two lines 15 of prescribed length and location. These slits will form the flaps for the bottom closure as hereinafter described. When the tube is formed, the slits of one ply may coincide with the slits of the other ply or may be offset and in different positions. At the stage when the slits are made in the ply it is also convenient to make apertures 16 (FIG. 1) of desired size and number in the outer ply and in a position for the apertures to appear in one of the face flaps of the bottom. As shown in FIG. 1 the apertures 16 are of the same size, close together and side by side and are made with a U-shaped cutting device attached to the same rotating bar to which the slitter knives are attached. The cutout portion 17 is folded back along the line 18 so that it ultimately is between the outer and adjacent ply, leaving the apertures positioned to expose the paper ply underneath. It will be understood that such apertures can be made in a separate step from the slitting operation and that the cutout portion 17 may be removed completely rather than being folded back away from the aperture.

Figure 3:
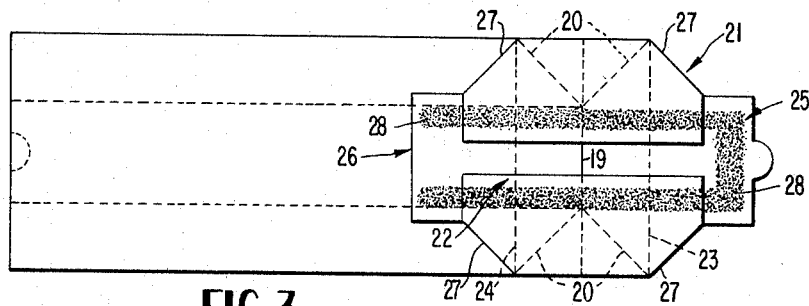
FIG. 3 is a top view of the tube of FIG. 2 with the bottom end opened up showing the first step in forming the bottom and the adhesive pattern.

The tube 12 is cut to desired bag length and the end is opened up as shown in FIG. 3 preparatory to forming the bottom. In opening up such end, the tube is folded back on a transverse fold line 19, the gussets are folded on diagonal fold lines 20, and the gusset flaps 21 and 22 are formed. By folding the tube along transverse lines 23 and 24, face flaps 25 and 26 are formed. These face flaps are defined by the slits 15, diagonal fold lines 27 and the transverse fold lines 23 and 24. These folding steps and the formation of the bottom closure are carried out in a manner and by means well known in the bag-making art. A U-shaped adhesive pattern 28 is coated on the flaps.

Figure 4:
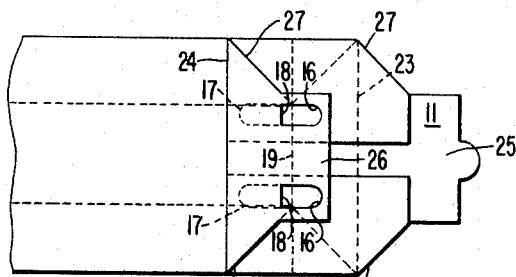
FIG. 4 is a top view of the tube of FIG. 3 showing the second step in forming the bottom.
Figure 5:
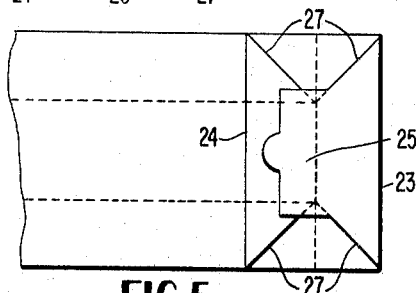
FIG. 5 is a top view of the tube of FIG. 4 showing the completed bottom.

FIG. 4 shows the next step in the formation of the bottom closure. The flaps 26 is folded over on the line 24. In this position, the top of flap 26 presents the outer plastic coated surface of ply 10. The next step, shown in FIG. 5 is to fold the flap 25 on the line 23 to superimpose flap 25 over flap 26 and bond it thereto. As heretofore stated, the folding is accomplished automatically on conventional bag-making equipment. In the absence of the openings or cutouts 16 in the top of flap 26 it would be necessary to bond the plastic coated surface of flap 26 to the paper of flap 25. As stated above, plastic is poorly receptive to the adhesive used with paper stock and the resulting bond would be unsatisfactory. However, because of the openings 16, it is possible to bond the paper exposed through the openings 16 of flap 26 to the paper of flap 25. This paper-to-paper bond between the two flaps results in a strong bottom closure.

Figure 6:
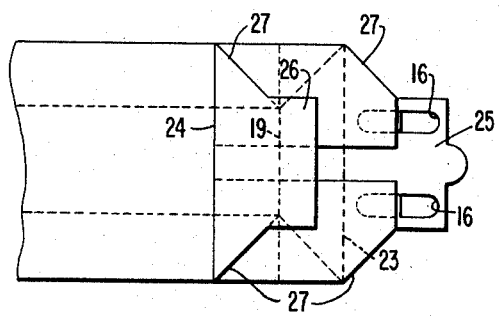
FIG. 6 is a top view similar to FIG. 4, of a multiply tube with an adhesive-resistant inner ply showing one form of openings in the inner ply.
Figure 7:
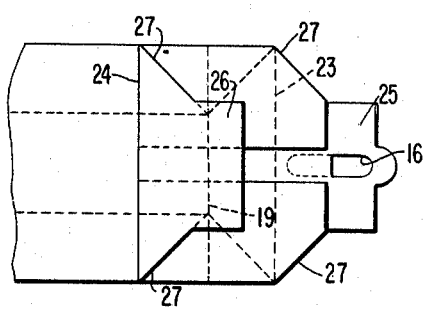
FIG. 7 is a top view, similar to FIG. 6 showing another form of opening in the inner ply.

When the outer ply of the tube is paper and the inner ply has an inner surface which is adhesive-resistant, such as coated paper, laminated paper, or plastic, the present invention can be applied as shown in FIG. 6 or FIG. 7. In such case apertures 16 of desired size and number are made in the inner ply in a position to appear in one of the face flaps of the bottom. Such apertures are formed as heretofore described. It will be seen in FIG. 6 with two openings 16 and in FIG. 7 with one opening that the paper exposed through the opening in flap 25 will be bonded to the paper of flap 26. This illustrates the paper-to-paper bond when the adhesive-resistant surface is on the inner face of the bag.

It will be apparent that the openings can be applied not only to a duplex bag as heretofore described but can also be used for bags of more than two plies with one or more adhesive-resistant sheets in various positions. For example, the adhesive-resistant sheet might be a liner ply or an intermediate ply or in both positions as long as there is an adjacent ply which is receptive to adhesives.

Although the principal object of this invention is to overcome or minimize defects resulting from ineffective adhesive bonds in the bottom closure of bags of the style and construction described above, it will be apparent that the invention can be used to overcome or minimize defects resulting from ineffective adhesive bonds between plies of multiwall bags at positions other than the bottom closure. For example, the invention would be applicable to pasted top closures or to sections between plies near the top of open mouth multiwall bags, these sections being generally in a line transverse to the bag length.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

Having described our invention, what we claim as new and desire to secure by Letters Patent is:

1. A multiply bag comprising:
  (a) a first ply of paper which is receptive to the adhesive which is used for bonding to the remaining plies of the bag;
  (b) a second ply having a plastic surface which resists bonding by the adhesive;
  (c) a bottom closure having inwardly folding gusset flaps and top and bottom face flaps which are hinged to the body of the bag along lines which are spaced inwardly from the coextensive ends of said first and second plies;
  (d) said gusset flaps underlying said top and bottom face flaps;
  (e) said top face flap coming into facing and closing contact with the inwardly folded bottom face flap;
  (f) an elongated opening in said second ply which is spaced inwardly from the sides of the bag and lies adjacent an inner edge of an inwardly folded gusset flap in the folded position with the longer edge of said opening being transverse to the outer edges of the top and bottom face flaps; and,
  (g) a band of adhesive extending along areas of contact between said gusset flaps and said top and bottom face flaps, the adhesive of said band adhering mating areas of paper in portions of said top and bottom face flaps through said opening.

2. A multiply bag as claimed in claim 1, wherein there is provided one elongated opening in said second ply to overlie each of said inwardly folded side flaps.

References Cited

UNITED STATES PATENTS

| | | | |
|---|---|---|---|
| 1,885,670 | 11/1932 | Avery | 229—59 |
| 1,988,462 | 1/1935 | Royal. | |
| 2,864,549 | 12/1958 | Hayward et al. | 229—57 |

DAVID M. BOCKENEK, Primary Examiner

U.S. Cl. X.R.

229—55, 60